No. 740,171. PATENTED SEPT. 29, 1903.
C. M. PALMER.
CONTINUOUS AND PULSATORY CURRENT ELECTRIC MOTOR.
APPLICATION FILED SEPT. 23, 1901.
NO MODEL.
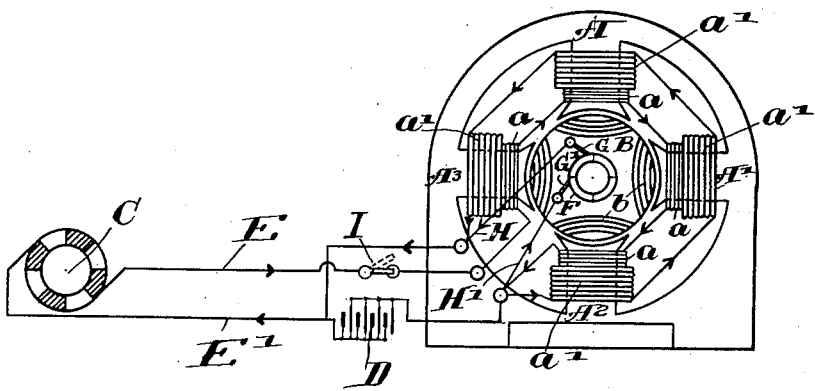
Witnesses:-
Carl A. Crawford
W. L. Hall
Inventor:-
Chester M. Palmer
by Poole & Brown
his Attorneys

UNITED STATES PATENT OFFICE.

CHESTER M. PALMER, OF FOND DU LAC, WISCONSIN.

CONTINUOUS AND PULSATORY CURRENT ELECTRIC MOTOR.

SPECIFICATION forming part of Letters Patent No. 740,171, dated September 29, 1903.

Application filed September 23, 1901. Serial No. 76,292. (No model.)

*To all whom it may concern:*

Be it known that I, CHESTER M. PALMER, a resident of Fond du Lac city, county of Fond du Lac, and State of Wisconsin, have invented new and useful Improvements in a Combined Continuous and Pulsatory Electric Current Motor, of which the following is a specification.

This invention relates to improvemments in electric motors, and refers more particularly to a novel construction in an electric motor wherein is employed the combined use of continuous and intermittent or pulsatory currents for exciting the field-magnets and wherein the armature-circuit is adapted to be energized by a source of continuous current; and the invention refers also to a novel method of deriving the source of continuous current and its connection with the continuous-current circuits of the motor.

The improvements consist, first, in the combined application of continuous and intermittent or pulsatory currents derived from independent energizing-circuits of the same magnetic direction for exciting the field-magnets of a motor in which the armature-circuit is adapted to be energized by a source of continuous current, and, secondly, in the connection of a storage battery in a motor-circuit containing a source of pulsatory or intermittent electric current, whereby said storage battery is energized by the pulsatory or intermittent current, and in the connection of the continuous-current circuits of the motor with the storage battery, whereby the latter constitutes a source of continuous-current energy for exciting said circuits.

The invention consists in the matters hereinafter set forth, and more particularly pointed out in the appended claims.

In the drawing is illustrated, diagrammatically, a side elevation of a motor embodying my improvements and illustrating the circuits connecting the field and armature circuits with the sources of continuous and pulsatory or intermittent currents.

As shown in said drawing, A A' A² A³ designate field-magnets, and B the armature rotating within said field-magnets.

C designates the source of pulsatory or intermittent current, and D the source of continuous current, herein shown as a storage battery, which is charged from the source of pulsatory or intermittent current, though said source of continuous current may be independent of the source of pulsatory or intermittent current. The field-magnet cores are each wound with two coils $a\ a'$, one surrounding and insulated from the other. The armature B is provided with armature-coils $b$. The coils $a$ of the magnet are connected in series with the source of direct intermittent or pulsatory current C through conductors E E', and the storage battery D is included in the conductor E'. The armature-coils $b\ b$ are connected in circuit with the storage battery D through a commutator F, brushes G G', and conductors H H', and the field-coils $a'$ are in series and are connected in shunt with said armature-coils $b$.

In the operation of the motor it is started as an ordinary continuous-current motor from current derived from the battery D or other source of continuous current, and after the desired speed of the motor has been attained the source of pulsatory current C is connected in circuit with the field-coils $a$ by means of a switch I, the motor thereafter operating as a combined continuous and pulsatory or intermittent current motor, the pulsatory or intermittent current from the source C energizing the storage battery D, whereby the latter constitutes a source of continuous current for exciting the continuous-current circuits of the motor.

Any desired form of construction, connection of circuits, and devices for adjusting the lead of the brushes known in the art may be used in connection with my improvement in the construction of the motor, and any desired source of continuous current may be used for exciting the continuous-current circuits of the motor.

I claim as my invention—

1. In an electric motor, the combination with a field-magnet provided with two circuit-coils of the same magnetic direction and an armature, of a source of continuous current connected with one of said coils and a source of direct intermittent or pulsatory current connected with the other coil.

2. In an electric motor, the combination with field-magnets each provided with two circuit-coils, the similar coils of said magnets being connected in series, of a source of continuous current connected with one of said series and a source of direct pulsatory or intermittent current connected with the other series.

3. In an electric motor, the combination with a field-magnet provided with two circuit-coils of the same magnetic direction, and an armature, of a source of continuous current connected with one of said field-coils and with the armature-circuit and a source of pulsatory or intermittent current connected with the other field-coil.

4. In an electric motor, the combination with a field-magnet provided with two circuit-coils in series, and an armature, of a source of direct pulsatory or intermittent current in circuit with said coils and a storage battery bridged across one of said coils and supplying current to the coil across which it is bridged.

5. In an electric motor, the combination with a field-magnet provided with two circuit-coils in series, and an armature, of a source of direct pulsatory or intermittent current in circuit with said coils and a storage battery bridged across one of said coils and supplying current to the armature and to the coil across which it is bridged.

6. In an electric motor, the combination with a continuous-current energizing-circuit and a source of direct pulsatory or intermittent current connected with said circuit, of a storage battery bridged across said circuit, said storage battery supplying current to said circuit.

7. In an electric motor, the combination with the energizing-circuits thereof and a source of direct pulsatory or intermittent current, said circuits being connected in parallel with said source of pulsatory or intermittent current, of a storage battery bridged across said parallel circuits, said storage battery supplying current to the circuits across which it is bridged.

CHESTER M. PALMER.

Witnesses:
GEO. E. BAYHA,
WILLIAM T. CONDON.